United States Patent Office 3,770,804
Patented Nov. 6, 1973

3,770,804
SIMULTANEOUS RECOVERY OF TEREPHTHALIC ACID AND DIMETHYL TEREPHTHALATE FROM CRUDE TEREPHTHALIC ACID
Hans Juergen Nienburg and Wolfgang Eisfeld, Ludwigshafen, and Hans Joachim Astheimer, Neuhofen, Germany, assignors to Badische Anilin- & Soda-Fabrik Aktiengesellschaft, Ludwigshafen (Rhine), Germany
No Drawing. Filed Aug. 6, 1971, Ser. No. 169,843
Claims priority, application Germany, Aug. 14, 1970, P 20 40 453.9
Int. Cl. C07c 69/82
U.S. Cl. 260—475 R                2 Claims

ABSTRACT OF THE DISCLOSURE

Recovery of pure terephthalic acid and pure dimethyl terephthalate by vaporizing crude terephthalic acid in a stream of gaseous methanol at a temperature of from 300° to 400° C., condensing pure terephthalic acid out from this mixture of methanol and terephthalic acid vaport by cooling it to a temperature of from 200° to 320° C. and passing the remaining vapors over a solid esterification catalyst. Terephthalic acid and dimethyl terephthalate are raw materials for the production of polyethylene terephthalates from which synthetic fibers are manufactured.

---

The invention relates to a process for the simultaneous recovery of pure terephthalic acid and pure dimethyl terephthalate from crude terephthalic acid by carrier distillation and fractional separation of terephthalic acid and recovery of dimethyl terephthalate from the vapor mixture.

Terephthalic acid is mainly used for the manufacture of polyethylene terephthalate from which mainly fibers are manufactured, for which application a very high purity is necessary. Terephthalic acid which has been prepared by the conventional method by oxidation of p-xylene in a lower alkanoic acid with air in the presence of an oxidation catalyst therefore requires an expensive purification, which is often carried out by way of dimethyl terephthalate. For example German Pat. 1,188,580 discloses a process for the esterification of terephthalic acid with methanol vapor in the vapor phase at about 300° C. and at atmospheric pressure in contact with a silicic acid catalyst, in which upon cooling of the vapor mixture a mash of dimethyl terephthalate in methanol is obained from which the dimethyl terephthalate is separated and can then be converted by distillation into pure dimethyl terephthalate. The dimethyl terephthalate then has to be transesterified for the production of polyethylene terephthalate.

Attempts have been made to produce terephthalic acid of such a purity that it can be used after direct esterification with ethylene glycol for the manufacture of fibers, i.e. methods are used in which the terephthalic acid is purified direct, without the dimethyl terephthalate stage. For example it is known from U.S. Pats. 2,923,736 and 3,330,863 that terephthalic acid can be purified by sublimation into a stream of inert gas at atmospheric pressure and at a temperature of about 320° C. followed by fractional desublimation, nitrogen, air and especially steam being used as the inert gas. The result depends on (a) the loading of the inert gas with terephthalic acid and
(b) the desublimation temperature.

Naturally the type and amount of impurities also exert an influence.

In all prior art methods for purifying crude terephthalic acid, either dimethyl terephthalate alone or pure terephthalic acid alone is obtained. Since there is a demand on the market for both dimethyl terephthalate and pure terephthalic acid, the manufacturer has the problem of having available both products in the high purity. There is therefore the need for a process by which there are recovered in one operation both pure terephthalic acid such as is suitable for the manufacture of fibers and also pure dimethyl terephthalate (which if necessary requires only one purification) which will satisfy all requirements from a crude terephthalic acid.

It is an object of the invention to provide a process for the simultaneous recovery of pure terephthalic acid and pure dimethyl terephthalate from crude terephthalic acid. Another object of the invention is to provide a simple procedure for the recovery of a maximum of desired products from crude terephthalic acid. These and other objects and advantages will be better understood from the following detailed description.

We have found that pure terephthalic acid and pure dimethyl terephthalate can be recovered from terephthalic acid containing impurities by vaporizing the terephthalic acid in a carrier gas stream at from 300° to 400° C. followed by esterification of the vaporized terephthalic acid with methanol in contact with a fixed-bed esterification catalyst, by using as the carrier gas for the terephthalic acid, methanol vapor or a gas mixture containing methanol vapor, cooling the stream of methanol vapor containing terephthalic acid to from 200° to 320° C. but at least 30° C. below the vaporization temperature so as to separate terephthalic acid therefrom, and passing the remaining vapor mixture, with or without fresh heating, over the esterification catalyst.

It is surprising that it is possible to separate pure terephthalic acid from the stream of methanol vapor.

A suitable starting material is crude terephthalic acid such as has been obtained in the oxidation of p-xylene or partial oxidation products of p-xylene in acetic acid in the presence of cobalt ions and bromides or compounds yielding bromine ions with a gas containing molecular oxygen. Terephthalic acid which has been prepared in this way contains mainly 4-carboxybenzaldehyde and p-toluic acid in addition to other impurities, including those which may cause discoloration in the production of the polyester. The total content of impurities is generally less than 1.0%, particularly less than 0.5%.

The carrier used is methanol or a gas mixture containing methanol and up to 20% by volume of inert gas such as nitrogen, carbon dioxide or water.

Loading of the stream of methanol vapor with terephthalic acid may be carried out by conventional methods, preferably at atmospheric pressure. For example finely powdered solid terephthalic acid may be metered into a turbulent stream of methanol initially heated only slightly above the vaporization temperature and the mixture then heated in a superheater at from 300° to 400° C. to a homogeneous or substantially homogeneous gas phase. Terephthalic acid may also be metered into a fluidized bed heated to the said temperature, methanol vapor being used as fluidizing gas and an inert fluidizing aid which serves at the same time as a heat carrier, e.g. sand. The use of temperatures below 300° C. is possible but a fairly low degree of loading is then achieved. Temperatures which substantially exceed 400° C. may give trouble because methanol and terephthalic acid do not then have sufficient thermal stability. The process is usually carried out at atmospheric pressure but it may also be carried out at subatmospheric pressure. A higher loading can be achieved by decreasing the pressure. It is advantageous to pass the stream of vapor through a filter, for example of glass cloth, to remove entrained solids. The methanol vapor containing terephthalic acid is cooled, i.e.

the temperature of the vapor mixture is lowered by at least 10%, i.e. by at least 30° C., namely to about 200° to 320° C. This means that when vaporizing at 300° C., cooling will be to at least 270° C. and when vaporizing at 400° C. cooling will be to 320° C.

Terephthalic acid thus separates in solid form. Cooling may be effected for example by adding solid terephthalic acid or admixing colder methanol vapor or by means of another cooling gas. Naturally the vapors may also be passed through cooled tubes so that terephthalic acid separates on the wall thereof. The deposited terephthalic acid can then be removed mechanically. As regards the deposition temperature it is advisable not to go below the dewpoint of the impurities entrained in the vapors, because otherwise these impurities will also be deposited at least in part. There is therefore a temperature limit dependent on the type of impurities and on the amount of impurities below which the terephthalic acid deposited will no longer satisfy the purity requirements for the manufacture of fibers. These may be characterized as follows:

ash content: 15 p.p.m. max.
total amount of metals: 10 p.p.m. max.
4-carboxybenzaldehyde: 25 p.p.m. max.
toluic acids: 100 p.p.m. max.
APHA color number (5% in solution in dimethylformamide): 10 max.

After some, for example from 50 to 95%, of the sublimed terephthalic acid together with the entrained impurities has been deposited, the gas mixture is passed, with or without heating, mainly at atmospheric pressure over a conventional esterification catalyst, for example silicic acid, preferably in the form of silica gel. This catalyst may be used as a fixed bed or fluidized bed catalyst. The esterification temperature is from 250° to 350° C., the most favorable temperature depending mainly on the type of catalyst but also on the loading of the methanol with terephthalic acid, on any water content and, as usual, on the residence time and any pressure used. Experience has shown that high temperatures and/or too long residence times result in damage to the catalyst and loss by decomposition. At too low temperatures and/or too short residence times, the esterification remains incomplete. The mixture leaving the catalyst consists substantially of methanol, dimethyl terephthalate, water and impurities. Upon cooling a mash of dimethyl terephthalate in methanol is obtained. Although the dimethyl terephthalate thus prepared already has a high purity, it is generally not sufficient if the product is to be used for the manufacture of polyethylene terephthalate for fibers. It is therefore convenient for the dimethyl terephthalate to be purified by a known method, for example by distillation.

The following example illustrates the invention.

EXAMPLE

Methanol vapor heated to 400° C. is passed at the rate of 45 grams per hour at atmospheric pressure through a horizontal alloy steel tube having an internal diameter of 30 mm. and a length of 2500 mm. which consists of five identical individual tubes screwed into one another and embedded in five blocks of aluminum which are capable of being heated independently of each other. The first two lengths of tube serve as a sublimator; they contain terephthalic acid as a loose filling and there is a glass fiber filter at the end; the third length of tube serves as a desublimator; the fourth as a heating zone; and the fifth as an esterification reactor; it contains 100 grams of silica gel (wide-pored, devoid of iron, particle size from 2 to 6 mm.) which has previously been activated with methanol vapor at 300° C. The gas leaving the tube is passed into a flask having a reflux condenser and is condensed. The results obtained in three individual experiments are collected in Table 1.

The desublimated terephthalic acid obtained from experiments 1 and 2 in each case polycondensed at 280° C. with the stoichiometric amount of ethyl carbonate up to the relative viscosity 1.42 (c.=0.1%) in tetrachloroethane and phenol 1:1. The polyester has the same whiteness, the same softening point (262° C.) and can be drawn into high tenacity threads in the same way as a comparative polyester from commercial terephthalic acid of a fiber quality which has been prepared under the same conditions.

TABLE 1

| Experiment number | 1 | 2 | 3 |
| --- | --- | --- | --- |
| Duration of experiments (hours) | 8.2 | 6.5 | 7.0 |
| Sublimation temperature (° C.) | 330 | 335 | 335 |
| Sublimed terephthalic acid: | | | |
| Amount (grams) | 28.8 | 28.1 | 29.8 |
| Acid number | 674 | 674 | 674 |
| Content of 4-carboxybenzaldehyde (p.p.m.) | 1,400 | 1,400 | 1,400 |
| Desublimation temperature (° C.) | 205 | 260 | 290 |
| Desublimed terephthalic acid: | | | |
| Amount (grams) | 26.8 | 24.0 | 15.1 |
| Acid number | 676 | 676 | 676 |
| Content of 4-carboxybenzaldehyde (p.p.m.) | 44 | 20 | 13 |
| Esterification temperature (° C.) | 310 | 300 | 310 |
| Crude dimethyl terephthalate:[1] | | | |
| Amount (grams) | 0.9 | 3.1 | 15.1 |
| Acid number | 2 | 8 | 5 |

[1] Evaporation residue of the total condensate.

We claim:
1. A process for the simultaneous recovery of pure terephthalic acid and dimethyl terephthalate from terephthalic acid containing impurities by vaporizing the crude terephthalic acid in a carrier gas stream of methanol at 300° to 400° C. which comprises separating purified terephthalic acid from the methanol vapor stream containing vaporized terephthalic acid in a desublimation zone by cooling to 200° to 320° C. but at least 30° C. below the vaporizing temperature, passing the remaining vapor mixture, with or without additional heating, directly from said desublimation zone over a solid esterification catalyst, and recovering the dimethyl terephthalate formed.

2. A process as claimed in claim 1 wherein the carrier gas is a mixture of methanol vapor and up to 20% by volume of an inert gas.

References Cited

UNITED STATES PATENTS 3,330,863  7/1967  Read et al. _____ 260—525
3,377,376  4/1968  Gainer et al. _____ 260—475
3,617,226  11/1971  Lest et al. _____ 260—475

FOREIGN PATENTS 1,049,720  11/1966  Great Britain _____ 260—525

LORRAINE A. WEINBERGER, Primary Examiner

E. J. SKELLY, Assistant Examiner

U.S. Cl. X.R.
260—475 B, 525